(12) United States Patent
Harbarth et al.

(10) Patent No.: US 8,930,767 B2
(45) Date of Patent: Jan. 6, 2015

(54) TECHNIQUES FOR TEST AUTOMATION IN EMERGENT SYSTEMS

(71) Applicant: Software AG, Darmstadt (DE)

(72) Inventors: Juliane Harbarth, Darmstadt (DE); Harald Sch-Ning, Dieburg (DE); Helmut Kuhn, Griesheim (DE)

(73) Assignee: Software AG, Darmstadt (DE)

( * ) Notice: Subject to any disclaimer, the term of this patent is extended or adjusted under 35 U.S.C. 154(b) by 207 days.

(21) Appl. No.: 13/708,110

(22) Filed: Dec. 7, 2012

(65) Prior Publication Data

US 2014/0164836 A1    Jun. 12, 2014

(51) Int. Cl.
G06F 11/00 (2006.01)
G06F 11/36 (2006.01)
G06Q 10/00 (2012.01)

(52) U.S. Cl.
CPC .......... *G06F 11/008* (2013.01); *G06F 11/3676* (2013.01); *G06F 11/3684* (2013.01); *G06Q 10/00* (2013.01)
USPC ........................................... 714/38.1; 714/25

(58) Field of Classification Search
CPC .................. G06F 11/3668; G06F 11/3672
USPC ................... 714/25, 38.1, 37, 45, 39, 32
See application file for complete search history.

(56) References Cited

U.S. PATENT DOCUMENTS

| | | | |
|---|---|---|---|
| 5,021,997 A | 6/1991 | Archie et al. | |
| 5,357,452 A | 10/1994 | Pio-di-Savoia et al. | |
| 5,359,546 A | 10/1994 | Hayes et al. | |
| 5,390,325 A | 2/1995 | Miller | |
| 5,490,249 A | 2/1996 | Miller | |
| 5,500,941 A | 3/1996 | Gil | |
| 5,542,043 A | 7/1996 | Cohen et al. | |
| 5,548,718 A | 8/1996 | Siegel et al. | |
| 5,590,330 A | 12/1996 | Coskun et al. | |
| 5,634,002 A | 5/1997 | Polk et al. | |
| 5,652,835 A | 7/1997 | Miller | |
| 6,167,537 A | 12/2000 | Silva et al. | |
| 6,249,882 B1 | 6/2001 | Testardi | |
| 6,601,018 B1 | 7/2003 | Logan | |

(Continued)

OTHER PUBLICATIONS

CentraSite. Working with Design/Change-Time Policies. Retrieved Online Dec. 7, 2012. http://documentation.softwareag.com/webmethods/wmsuites/wmsuite8-2_ga/CentraSite/8-2-SP1_CentraSite/ug-policies/working.htm#working.

(Continued)

*Primary Examiner* — Yolanda L Wilson
(74) *Attorney, Agent, or Firm* — Nixon & Vanderhye PC

(57) ABSTRACT

Certain example embodiments described herein relate to techniques for test automations in emergent systems. More particularly, certain example embodiments provide a mechanism for dynamic recognition of combinations of services/components, monitoring of their real-time usage, and automatic generation and running of tests for the combinations at appropriate times (e.g. when part of a combination is updated). The tests for individual (and, if available, combinations of) services are associated with the services using a registry. A taxonomy or ontology can be used to denote the semantics of the services, providing an array of options for assessing how and when to run tests and actions. It also is possible to detect similar combinations of services automatically. It therefore becomes possible to automate the detection and running of tests for a combination of services/components, even in emergent systems where such combinations cannot always be predicted in advance and where services/components are addable/modifiable over time.

25 Claims, 8 Drawing Sheets

(56) References Cited

U.S. PATENT DOCUMENTS

| | | | |
|---|---|---|---|
| 6,662,312 B1 | 12/2003 | Keller et al. | |
| 6,865,692 B2* | 3/2005 | Friedman et al. | 714/25 |
| 6,959,433 B1 | 10/2005 | Morales, Jr. et al. | |
| 7,028,223 B1* | 4/2006 | Kolawa et al. | 714/38.14 |
| 7,055,065 B2 | 5/2006 | Farchi et al. | |
| 7,222,265 B1 | 5/2007 | LeSuer et al. | |
| 7,529,977 B2 | 5/2009 | Parvathy et al. | |
| 7,614,042 B1 | 11/2009 | Hardy et al. | |
| 7,694,181 B2 | 4/2010 | Noller et al. | |
| 7,849,448 B2* | 12/2010 | Yunus et al. | 717/126 |
| 8,219,854 B2* | 7/2012 | Busayarat et al. | 714/26 |
| 2001/0052089 A1 | 12/2001 | Gustavsson et al. | |
| 2003/0191988 A1* | 10/2003 | Dalal et al. | 714/39 |
| 2004/0199818 A1* | 10/2004 | Boilen et al. | 714/25 |
| 2006/0265475 A9* | 11/2006 | Mayberry et al. | 709/219 |
| 2009/0006897 A1 | 1/2009 | Sarsfield | |
| 2009/0089625 A1* | 4/2009 | Kannappan et al. | 714/39 |
| 2009/0319832 A1* | 12/2009 | Zhang et al. | 714/38 |
| 2010/0095161 A1* | 4/2010 | Giat | 714/45 |
| 2011/0035629 A1 | 2/2011 | Noller et al. | |
| 2011/0161395 A1* | 6/2011 | O'Donnell et al. | 709/203 |
| 2012/0066550 A1* | 3/2012 | Keum et al. | 714/38.1 |
| 2013/0111445 A1* | 5/2013 | Jones | 717/124 |
| 2013/0166966 A1* | 6/2013 | Keum et al. | 714/48 |

OTHER PUBLICATIONS

Search Report issued on Jul. 18, 2013 in corresponding European Application No. 13154605.3, (9 pages).

Kallepalli et al. "Measuring and Modeling Usage and Reliability for Statistical Web Testing," IEEE Transactions on Software Engineering, vol. 27, No. 11, Nov. 2001, pp. 1023-1036.

Osama Sammodi et al. "Usage-Based Online Testing for Proactive Adaptation of Service-Based Applications," 2011 $35^{th}$ IEEE Annual Computer Software and Applications Conference, Jul. 18, 2011, pp. 582-587.

Gerd Schneider et al., "The CentraSite Community: Fast-Tracking SOA Governance Using Best-of-Breed Solutions," Sep. 2008, (22 pages).

Mustafa Bozkurt et al. "Testing Web Services: A Survey Technical Report TR-10-01," Jan. 2010, pp. 1-50.

* cited by examiner

TECHNIQUES FOR TEST AUTOMATION IN EMERGENT SYSTEMS

TECHNICAL FIELD

Certain example embodiments described herein relate to techniques for test automations in emergent systems. More particularly, certain example embodiments relate to techniques for dynamic recognition of combinations of services/components, monitoring of their real-time usage, and automatic generation and running of tests for the combinations at appropriate times (e.g. when part of a combination is updated). It also is possible in certain example embodiments to detect similar combinations of services automatically.

BACKGROUND AND SUMMARY OF EXAMPLE EMBODIMENTS OF THE INVENTION

Some systems offer to their customers services, e.g., in the form of callable components. Such systems are not necessarily established by one party alone. For example, in many cases, one party establishes the framework and allows other parties to deploy components into this framework that are callable by the customers or otherwise pertain to the system. This multi-ownership property may or may not be transparent to a given customer. Such systems might additionally or alternatively enable parties owning the components deployed to the platform to be able to more or less be constantly capable of providing, updating, deleting, or otherwise modifying, "their" components.

Apart from making the systems change their behaviors in potentially unexpected ways, the ability for parties to change their deployed components also enables the systems to perform tasks using possibly unexpected combinations of components that may or may not have been possible and/or intended by any of the component suppliers. Systems that behave as such are often referred to as "emergent."

For convenience, the party providing the framework may be referred to as a "provider" and the parties adding components to this framework may be referred to as "partners." An example involves a provider offering a platform for scheduling holidays, with the partners providing components for ordering services in this scenario. Those services could include, for example, flights, hotels, sightseeing-trips, and/or the like.

The provider of an emergent framework oftentimes will have an interest that the components included by partners work satisfactorily. Thus, it may be advisable for a provider to ask the partners to also provide a test relevant to each component deployed to the framework. The provider thus may be able to run these tests (e.g., at regular intervals) to help ensure that each component works as expected, on its own. When and how often such tests run may depend, for example, on the frequency they are called, the relevance for the provider and/or the partner, and/or other factors.

The nature of an emergent system as described above provides value because it enables spontaneous collaboration between components provided by different partners. It will be appreciated, then, that the provider therefore has a high interest in not only regularly testing the components themselves, but also in testing those collaborations. But because neither the provider nor the partners can always foresee which combinations of components will exist during the platform's lifecycle, suitable tests for testing those combinations cannot always be provided by the provider or by the partners involved.

Thus, it will be appreciated that there is a need in the art for techniques for improving testing in connection with components themselves, and with collaborations as between multiple components, provided in emergent systems and/or the like.

One aspect of certain example embodiments relates to techniques that allow for testing mechanisms that are as emergent as the platform's service offerings.

Another aspect of certain example embodiments relates to the ability to automatically test on emergent platforms: single components as provided by partners, often-used combinations of components provided by possibly different partners, combinations of components provided by possibly different partners in which the components are each similar to corresponding components in such combinations, and/or specific combinations using additional knowledge acquired by combining asset's semantics and information obtained by system monitoring.

Another aspect of certain example embodiments relates to applying semantics to combination testing for combinations of services and/or components that can only normally be detected dynamically (and potentially cannot be predicted with a high degree of confidence).

Still another aspect of certain example embodiments relates to the detection and monitoring of combinations together with the automatic running of combination tests, e.g., for similar combinations as specified by a user and/or as detected using semantic concepts.

In certain example embodiments, a method for testing services deployed to hardware components in an emergent system is provided. The method comprises detecting when multiple calls to one or more of the services occur within (a) a single semantic context and/or (b) a predefined time period. Combinations of called services are identified based at least in part on said detecting. A registry entry is created, in a registry stored on a non-transitory computer readable medium, for each said identified combination, with each said registry entry associating the respective identified combination with registered assets representing the called services of the respective identified combination. A determination is made as to whether an identified combination is test-worthy. At least one executable test is associated, via at least one processor, with each said identified combination that is determined to be test-worthy.

In certain example embodiments, a method for testing services deployed to hardware components in an emergent system is provided. A registry stored on a non-transitory computer readable medium is maintained. The registry includes entries for combinations of services that are called in connection with one another, with each said entry associating the respective combination with registered assets representing the called services of the respective combination and indicating whether the respective combination is test-worthy. At least one executable test associated with a given combination is automatically executed, via at least one processor, (a) when the given combination has a service associated therewith that has been updated, and/or (b) at regular intervals.

In certain example embodiments, a computer system for testing software and/or hardware components provided by in an emergent system is provided. Processing resources include at least one processor and a memory. A registry is stored on a non-transitory computer readable medium. The processing resources are configured to cooperate to at least: detect when multiple calls affecting one or more of the components occur; identify combinations of components based at least in part on said detection; create a registry entry in the registry for each said identified combination, with each said registry entry associating the respective identified combination with registered assets representing the components of the respective identified combination; determine whether an identified combination is test-worthy; and associate at least one executable test with each said identified combination that is determined to be test-worthy.

In certain example embodiments, there is provided a non-transitory computer readable storage medium tangibly storing instructions that, when executed by at least one processor of a system, perform a method as described herein.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to techniques for facilitating test automations in emergent systems and/or the like and, more particularly, to techniques for improving testing in connection with components themselves, and with collaborations as between multiple components, provided in the same. This is made possible in certain example embodiments in connection with a registry that a provider uses to monitor and maintain the platform and its components.

Figure 1:
FIG. 1 is a screenshot of an example registry for monitoring and maintaining a platform and its components.

As is known, registries typically represent each component of the system, either being part of the framework or provided by a partner, as a so-called asset. FIG. 1 is a screenshot of an example registry. More particularly, the FIG. 1 screenshot is taken from Software AG's CentraSite product and shows the service listing in the CentraSite Control GUI, which provides a list of respective services. Services are provided in the FIG. 1 example for booking flights and booking hotels, and a version number is provided for each respective service.

A registry typically allows certain predefined mechanisms to structure the set of its assets, such as call hierarchies, technical type, provider, life-cycle-state, call-frequency, etc. Many registries also allow for the creation of customized structure mechanisms that allow for the introduction of application-specific logic. In the emergent case, the provider is likely to establish some logic that pertains to the topic of its framework.

Figure 2:
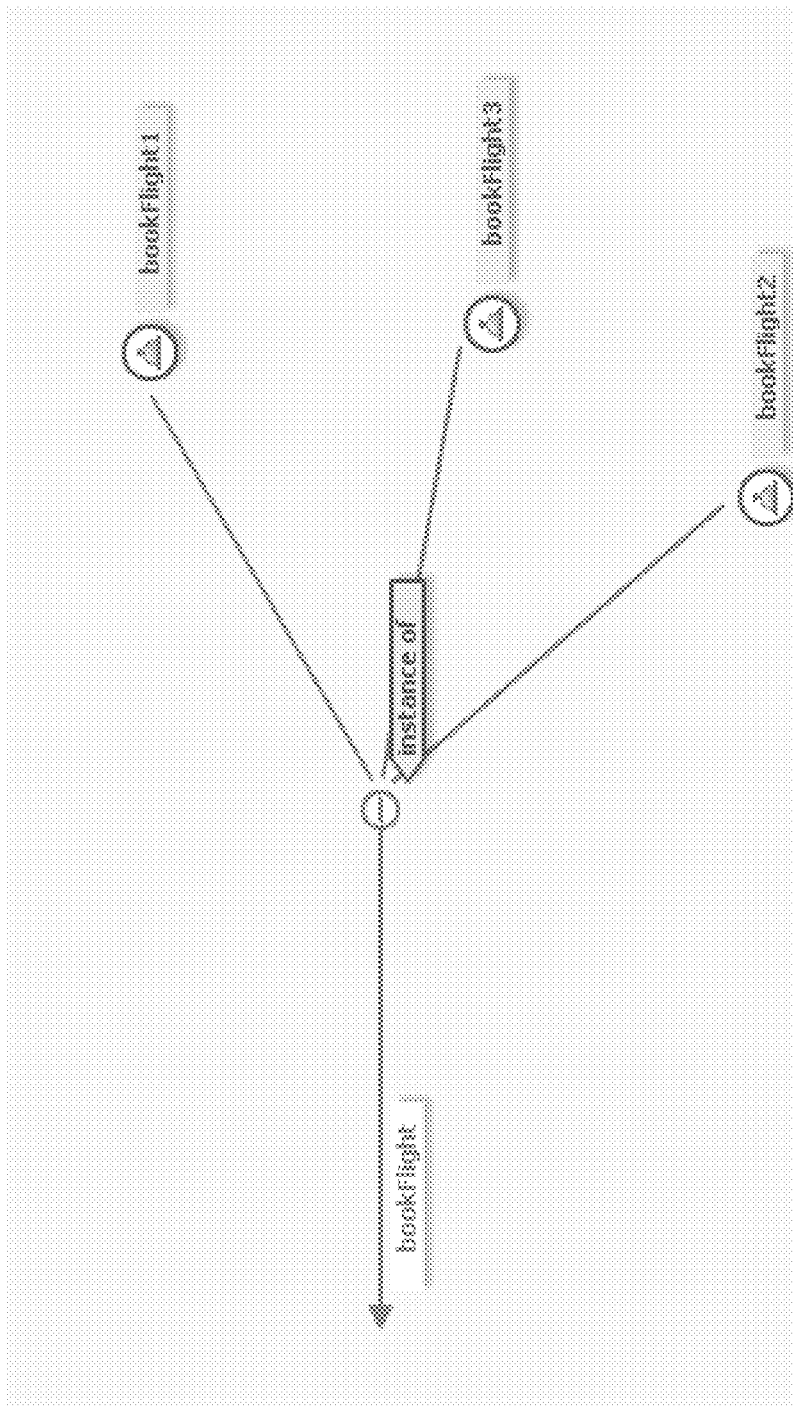
FIG. 2 is an example screenshot showing a service oriented architecture (SOA) registry impact analysis applied to the asset "bookFlight" in accordance with the FIG. 1 example.

FIG. 2 is an example screenshot showing an SOA registry's impact analysis applied to the asset "bookFlight" in accordance with the FIG. 1 example. The bookFlight asset is an instance of the user-defined asset-type "Topic" (not shown in FIG. 2). Each service that deals with flight booking is associated with this asset to denote the semantic coherence.

Figure 3:
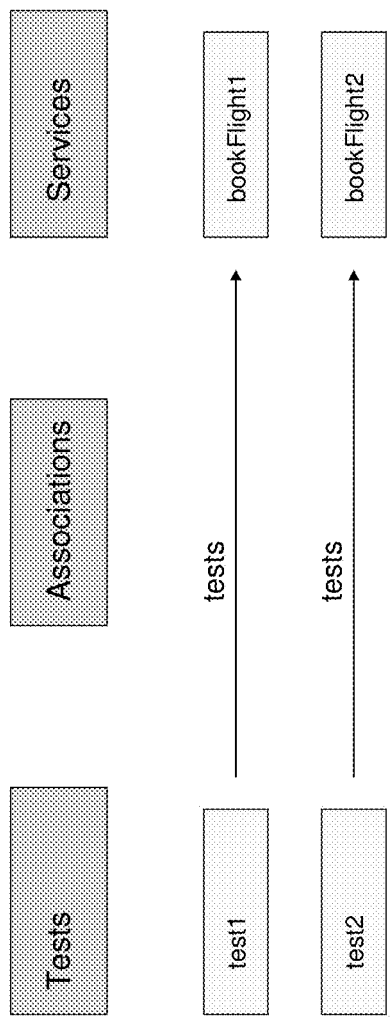
FIG. 3 is a schematic representation of an example mapping between tests and services, and the ways in which those tests and services are associated with one another, in accordance with certain example embodiments.

In accordance with certain example embodiments, the registry that helps to maintain the platform including the components deployed thereon may also be used to represent the tests and the connection between the tests and the components to be tested. In this regard, FIG. 3 is a schematic representation of an example mapping between tests and services, and the ways in which those tests and services are associated with one another, in accordance with certain example embodiments. Such mappings may, as alluded to above, be stored in the registry. As can be seen from the FIG. 3 example, test1 "tests" the asset bookFlight1, and test2 "tests" the asset bookFlight2.

The provision of a registry similar to the type shown in the FIG. 3 example helps to give the provider an overview of the current situation concerning services and their respective tests, including their mappings and types of associations. In addition, in certain example embodiments, the provision of a registry similar to the type shown in the FIG. 3 advantageously allows defining mechanisms to automatically execute the tests and specify suitable reactions. The mechanisms that are chosen for a given implementation may depend, for example, on the technical means of the SOA registry in use. In other words, the defining mechanism for automatically executing tests and specifying reactions may be tailored to the specific assets provided via the emergent system.

CentraSite, for example, allows both design-time policies and JAXR access. Thus, a suitable mechanism may include the definition of a "PreUpdate" policy for assets of type "Test" and a Java program updating Test-assets. The program may, for example, update "last-tested" attributes defined with the Test-assets. The application of a suitable PreUpdate policy defined for assets of type "Test" may, for example, cause an update of Test-assets to be automatically preceded by the policy's custom-action. This custom-action in some cases may involve executing the test belonging to the current asset and, in case of failure, sending notifications (e.g., email messages or the like) to administrators, marking the Test-asset in some way, and/or the like. Additional details concerning an example of this sort of functionality are provided in the CentraSite product documentation available from the assignee of the instant application and entitled: Working with Design/Change-Time Policies (available at http://documentation.softwareag.com/webmethods/wmsuites/wmsuite8-2_ga/CentraSite/8-2-SP1_CentraSite/ug-policies/working.htm#working).

Figure 4:
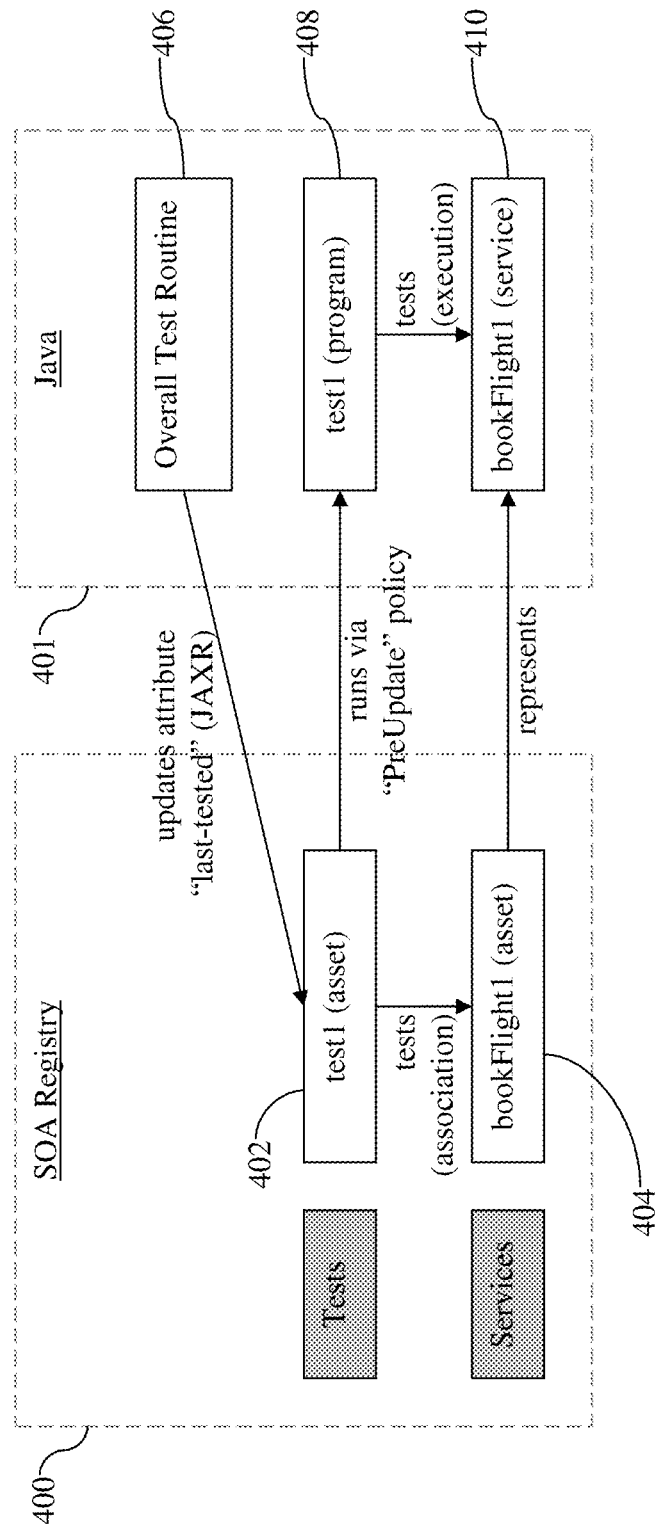
FIG. 4 is a schematic view of an SOA registry and a defining mechanism usable therewith to automatically execute tests and specify suitable reactions thereto.

FIG. 4 is a schematic view of an SOA registry 400 and a defining mechanism (which in this example is a Java environment 401) usable therewith to automatically execute tests and specify suitable reactions thereto in accordance with this CentraSite example. As can be seen from FIG. 4, the test1 test asset 402 has a defined association ("tests") with the book-Flight1 service asset 404, e.g., as shown in FIG. 3. The Java environment 401 includes an overall test routine 406 which, when executed, updates the "last-tested" attribute via JAXR. The test1 test asset 402 runs the test1 program 408, automatically, in accordance with the relevant PreUpdate policy. The test1 program 408 tests (e.g., executes) the bookFlight1 service 410, which is represented by the bookFlight1 service asset 404 in the SOA registry 400.

The provider is able to use the registry equipped with component-representing assets, test-assets, and policies to help automatically ensure that each single component provided by a partner is working. However, this only ensures the functioning of the single components and does not necessarily address the combinations of components provided by different partners as mentioned above.

For the sake of simplicity, it is assumed that all callable components on the platform are services. Of course, it will be appreciated that there may be callable objects that are not services in certain example implementations. In any event, assume further that a combination of components calls services one after the other in a way that suggests that the calls happen within one semantic context. A combination can be assumed in certain example instances if subsequent calls happen quickly, one after the other, and/or are issued by the same device or in the same session/user context, e.g., established by a hosting platform. The services need not necessarily be different ones; in some cases, calling one service multiple times also may be considered a combination in some circumstances. The following discussion focuses on combinations of two calls for simplicity, but the example techniques set forth herein may be made to apply to longer combinations in an analogous manner.

A provider may get an idea about which combinations may occur, and are thus test-worthy, by watching the usage of the system. As with single calls, the test-worthiness of combinations may depend at least in part on how often a combination occurs and how relevant it is (or its components are) for the provider or the partners involved.

Figure 5:
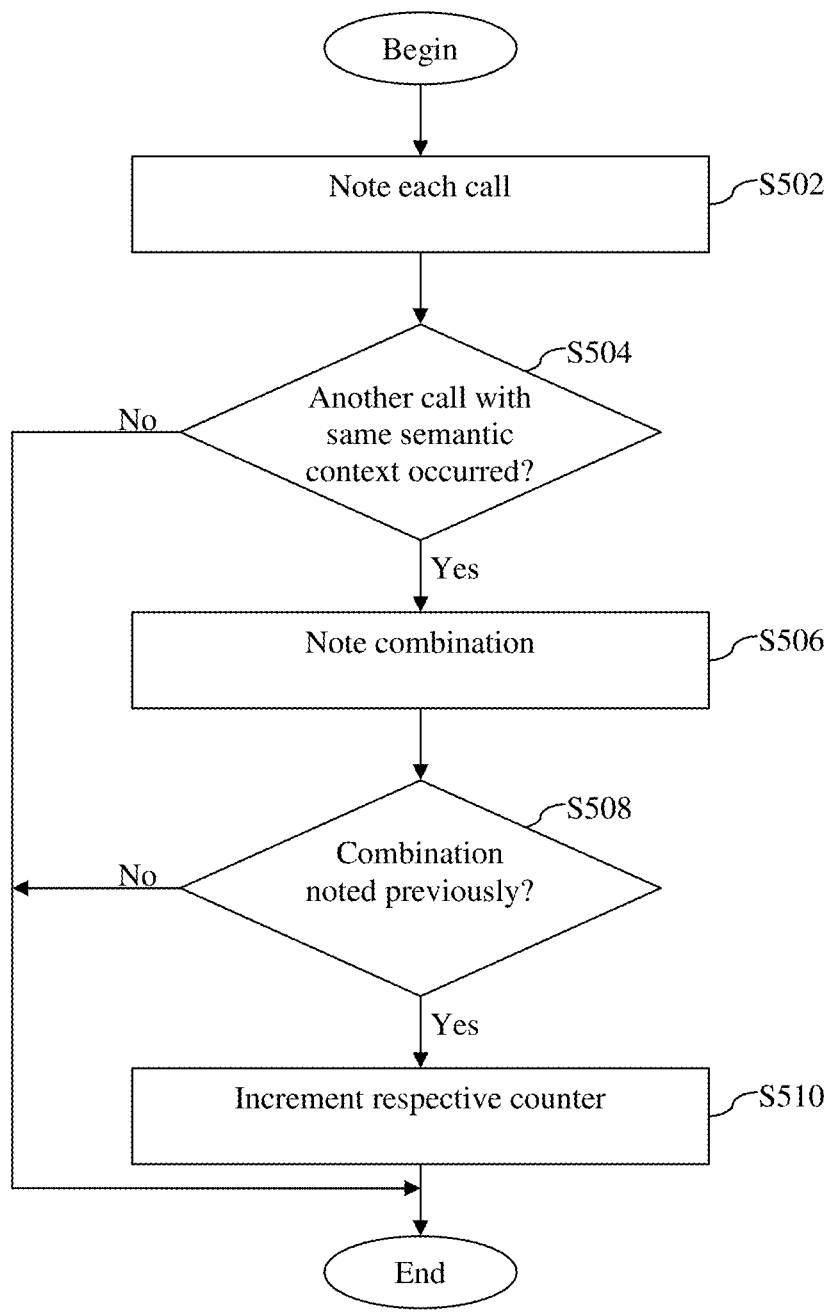
FIG. 5 is an example flowchart demonstrating how occurrences of combinations can be counted in accordance with certain example embodiments.

To count occurrences of combinations, the provider may, for instance, proceed as shown in the FIG. 5 example flowchart. Each call is noted (step S502), and a check is performed as to whether another call within the same semantic context occurred previously (step S504). If such a predecessor exists, the combination is noted (step S506) and, if this combination has been noted previously (as determined in step S508), a respective counter is incremented (step S510).

It is possible to use the SOA registry already in place for the registration mechanism of certain example embodiments, e.g., if the former supports (or has been modified to support) both user-defined types and run-time policies. In this regard, a new user-defined type "combinations" may be created, and an instance of this type may be created when a combination occurs. This new instance may be created with an attribute "noOccurrences" set to 1. Each subsequent call to the two combinations services may increment this counter.

Figure 6:
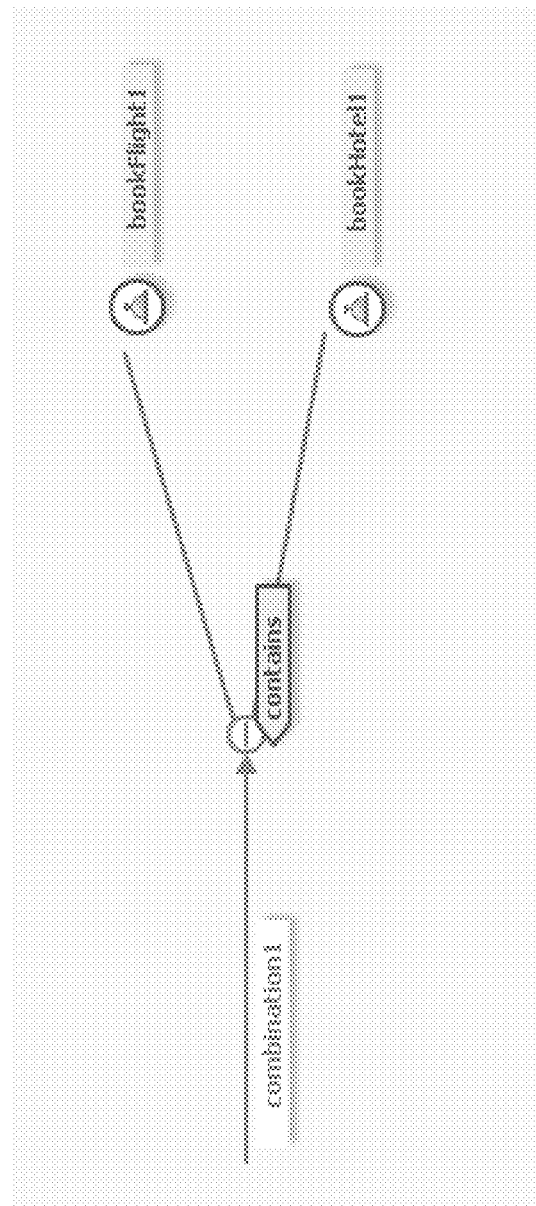
FIG. 6 is an illustration showing the association between a combination and the relevant services, in accordance with an example embodiment.

To enable combinations and the associated testing to be dealt with in the same way as with the testing of single components (e.g., at a later point in time), the registry may associate instances of the new user-defined type with its services, e.g., as shown in FIG. 6. FIG. 6 is an illustration showing the association between a combination and the relevant services, in accordance with an example embodiment. As shown in the FIG. 6 example, "combination1" is associated with two services and, in particular, it "contains" the bookFlight1 and bookHotel1 services.

Figure 7:
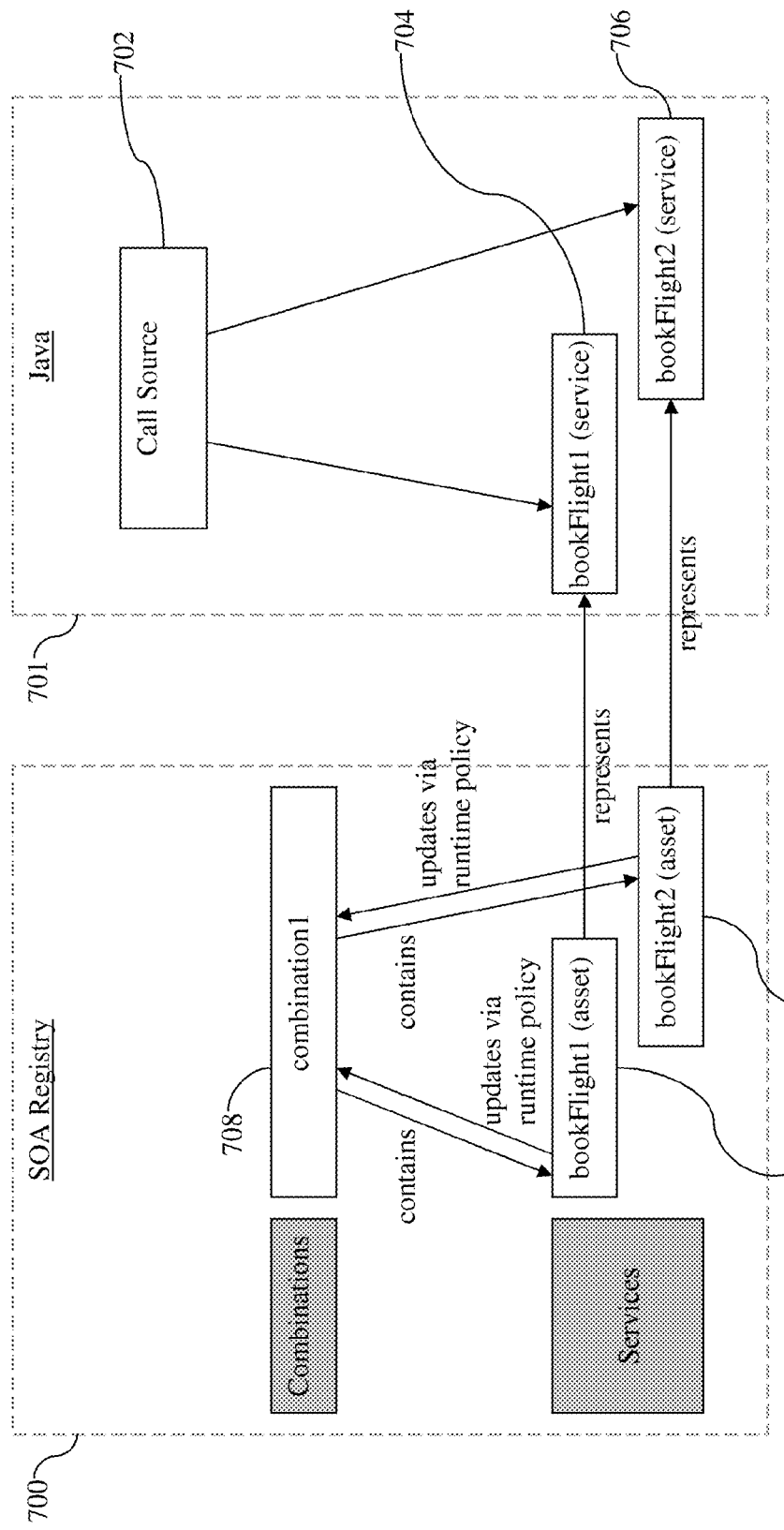
FIG. 7 is a schematic view of an SOA registry and a defining mechanism (which in this example is a Java environment) usable therewith in accordance with certain example embodiments.

FIG. 7 shows the complete picture with a combination, its associated service-Assets, and the real services the assets represent. That is, FIG. 7 is a schematic view of an SOA registry 700 and a defining mechanism (which in this example is a Java environment 701) usable therewith in accordance with certain example embodiments. It thus is somewhat similar to the FIG. 4 example, except that it includes a registry entry for a combination as discussed below. Calls from a source 702 (which in some cases may be a test, part of a deployed program, etc., from the Java environment 701) to the deployed services are noted by the runtime policies defined in the registry 700. A call to the service bookFlight1 704 is noted (e.g., on a scratchpad). A subsequent call to the service bookFlight2 706 is recognized as second part of a combination by comparison of the call information and/or the elapsed time. The combination combination1 708 is either created, or its counter is incremented. It is noted that the services have corresponding asset entries 710 and 712 stored in the registry 700.

If the counter reaches a first predefined threshold, the combination is declared as test-worthy. In certain example embodiments, the occurrence of the combination may be subsequently noted and, if the calls fall under a second predefined threshold (which may be the same or different from the first predefined threshold), the test-worthiness of the combination may be revoked. The first and second thresholds need not be the same for every combination but instead may depend on, for example, the relevance of the called components for the provider, the involved partners, the relevance of the involved partners for the provider, and/or the like. For instance, combinations that call services that are particularly computationally intensive, marked as critical or key services, support multiple services, etc., may have comparatively lower first thresholds associated with establishing test-worthiness and/or comparatively higher second thresholds associated with revocation of test-worthiness.

Each test-worthy combination may be associated with at least one executable test that helps ensure the functioning of the combination, e.g., by calling both services one after the other and in the proper sequence. These tests can be generated automatically in certain example embodiments. Collecting further information on the details of the calls to the combinations services may in some cases help the test-creating algorithms to mimic an appropriate real-world call-scenario by, for example, using common parameters for the service calls. In other cases, default parameters may be set to known or expected boundary conditions. Thus, certain example embodiments may involve automatic test generation, with such automatically generated tests including default service parameters to be used in the tests.

As with the single services, tests regarding combinations may be executed at regular intervals in certain example implementations. As long as these updates are noted by the registry and all assets are properly connected, it also is possible to make these tests automatic through the use of policies similar to those described above in connection with the single tests. In addition to these regular tests, it may be desirable in certain example scenarios to execute a combination-test in cases where one of its parts has been updated.

Figure 8:
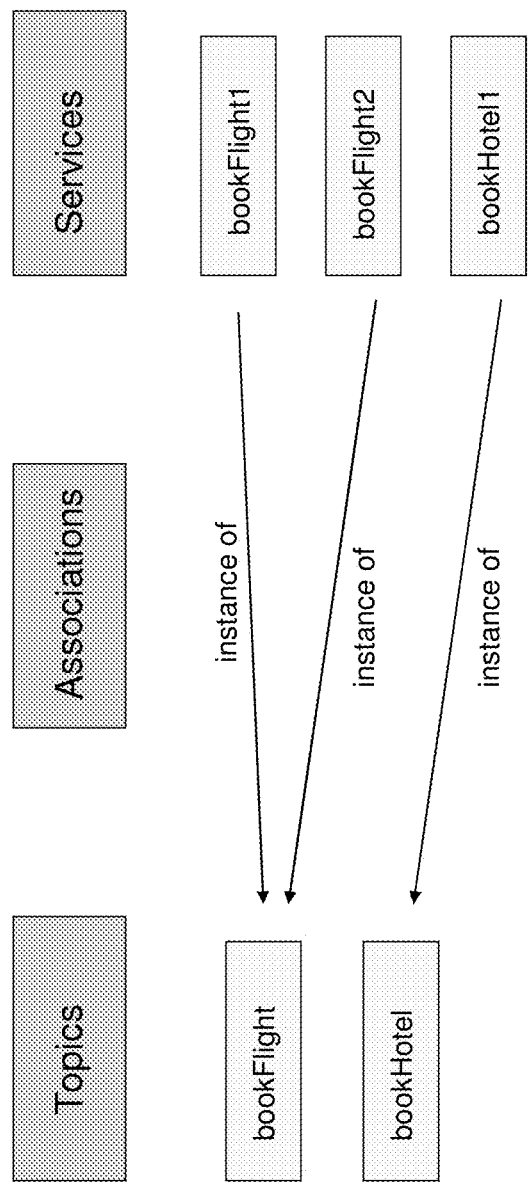
FIG. 8 provides a partial categorization of services that may be used in determining when to automatically test similar services or similar service combinations, in accordance with certain example embodiments.

If a combination has been declared as being test-worthy and thus is tested on a regular, controlled, or other basis, it may be desirable to treat similar combinations similarly, even though such similar combinations might not have been declared as being test-worthy themselves. The degree of "similarity" required may rely, for example, on parameters that are automatically detectable, e.g., so that a combination can automatically become regularly tested by virtue of its being similar to another combination that is heavily used, needs to be tested, etc. Thus, similarity of services may in some cases be defined by the services' semantics. The customized structure mechanisms provided by the registry accordingly may provide a natural mechanism for establishing the relationships. Of course, there are other options including, for example, the usage of a taxonomy or ontology to denote semantics of the service offerings. Because the provider sometimes will know best what topic is covered by its platform and which services may best be hosted therein, it can ask partners to qualify their services according to a schema the provider publishes. In the holiday scheduling example discussed above, the partners services may be thought of as falling into categories such as, for example, bookFlight, bookHotel, hireGuide, etc., and may be categorized as such. FIG. 8 provides a partial categorization of services that may be used in determining when to automatically test similar services or similar service combinations, in accordance with certain example embodiments. If, for example, in the scenario depicted in FIG. 8, bookFlight1 and bookHotel1 are a heavily used combination that is regularly tested, the combination of bookFlight2 and bookHotel1 might be tested as well, e.g., given the similarity of bookFlight1 and bookFlight2.

If a partner feels unable to categorize its services in the way prepared by the provider, this situation might present an opportunity for the provider to enlarge its schema. Alternatively, or in addition, the partner may also classify its service as belonging to an "other" category, or to no category at all. Doing so may, however, deprive the service of being noted as similar to some other service and thus from becoming applicable to combination-testing by heavy or closely related references to a similar other service. Still another option is that the classification may be dynamically self-extending, e.g., in the sense that partners may be able to freely categorize their offerings and describe the relationship(s) to already existing semantic categories using appropriate concepts. This may be facilitated using an ontology expressed using, for example, OWL or the like. Of course, if a partner is unable to categorize a service, this task may be left to the provider in certain example embodiments. It is noted that such classifications can be made via a suitable user interface to a test system, test computer, and/or the like.

It is noted that it is possible to leverage an even more involved usage of semantics in the context of certain example embodiments. As an example, in the holiday scenario discussed above, the provider might characterize topics as being of different importance. In this regard, booking a flight and a hotel may be considered more important to the traveler to-be than, for example, a guided tour. The combination of both booking a flight and a hotel may, for example, be of particular importance, as tourists rarely need one without the other. Such "importance reasoning" can be used in certain example embodiments to drive test generation and execution. In addition, or in the alternative, test cases where important services succeed while less important fail might be considered acceptable, whereas failure of important services might be considered an issue.

Semantics may also be used in certain example embodiments to derive that some services depend on each other. For instance, one generally will not book a hotel at a destination if one fails to get a flight there, and vice versa.

Thus, the combination of these information items might automatically lead to heavy testing upon such combinations of flight and hotel booking services, potentially in either sequence. In this sample case, semantics can be used to derive that the cancellation of one reservation has to be tested as well, if the other fails.

It will be appreciated that, in addition to semantic annotations, monitoring can also be used to derive that services depend on each other in certain example embodiments.

In view of the foregoing, it will be appreciated that the example techniques described herein may in some instances allow for testing mechanisms that are as emergent as the platform's service offerings. This in turn makes it possible to automatically test on emergent platforms: single components as provided by partners, often-used combinations of components provided by possibly different partners, combinations of components provided by possibly different partners in which the components are each similar to corresponding components in such combinations, and/or specific combinations using additional knowledge acquired by combining asset's semantics and information obtained by system monitoring.

Although certain example embodiments have been described in connection with the CentraSite product and a CentraSite-like registry, it will be appreciated that the example techniques set forth herein may be applied in scenarios where products other than CentraSite and CentraSite-like registries are provided. Similarly, although certain example embodiments have been described in connection with Java environments, it will be appreciated that the example techniques set forth herein may be applied to other environments and/or in connection with programs written in other languages.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for testing services deployed to hardware components in an emergent system, the method comprising:
   detecting when multiple calls to one or more of the services occur within (a) a single semantic context and/or (b) a predefined time period;
   identifying combinations of called services based at least in part on said detecting;
   creating a registry entry, in a registry stored on a non-transitory computer readable medium, for each said identified combination, each said registry entry associating the respective identified combination with registered assets representing the called services of the respective identified combination;
   determining whether an identified combination is test-worthy; and associating, via at least one processor, at least one executable test with each said identified combination that is determined to be test-worthy.

2. The method of claim 1, wherein said detecting includes detecting multiple calls to a single service, detecting multiple calls to multiple different services, and combinations thereof.

3. The method of claim 1, further comprising maintaining a counter for each said combination.

4. The method of claim 3, wherein counters are maintained in the registry.

5. The method of claim 1, wherein an identified combination is determined to be test-worthy if that identified combination counter meets or exceeds a predetermined threshold.

6. The method of claim 1, wherein an identified combination is determined to be test-worthy if that identified combination is associated with a service marked as being relevant.

7. The method of claim 1, further comprising for each said identified combination that is associated with at least one executable test, executing the respective at least one executable test at a regular interval and/or when a service associated with the respective combination is modified.

8. The method of claim 1, further comprising automatically generating tests to be applied to each said identified combination that is determined to be test-worthy.

9. The method of claim 8, wherein the automatically generated tests call the services associated with the identified combinations associated with the tests, in order and/or using default service parameters.

10. The method of claim 9, wherein the default service parameters are typical of a real-world call scenario.

11. The method of claim 9, wherein the default service parameters are set to known or expected boundary conditions.

12. The method of claim 1, further comprising classifying identified combinations into groups of similar combinations.

13. The method of claim 12, further comprising subjecting identified combinations within a group to their associated tests when any one identified combination in that group is to be tested.

14. The method of claim 12, wherein the classifying is performed in accordance with an ontology or taxonomy defined by the provider of the emergent system.

15. The method of claim 12, wherein the classifying is performed automatically based on the services in the identified combinations.

16. A non-transitory computer readable storage medium tangibly storing a program for testing services deployed to hardware components in an emergent system, the program comprising instructions that, when executed by a test computer including at least one processor, cause the computer to perform the method of claim 1.

17. A method for testing services deployed to hardware components in an emergent system, the method comprising:
maintaining a registry stored on a non-transitory computer readable medium, the registry including entries for combinations of services that are called in connection with one another, each said entry associating the respective combination with registered assets representing the called services of the respective combination and indicating whether the respective combination is test-worthy; and automatically executing, via at least one processor, at least one executable test associated with a given combination, (a) when the given combination has a service associated therewith that has been updated, and/or (b) at regular intervals.

18. The method of claim 17, wherein each said executable test is automatically generated using real-world test-case scenario data.

19. The method of claim 17, further comprising:
automatically classifying combinations into groups of similar combinations; and
subjecting combinations within a given group to their associated tests when any one combination in that given group is to be tested.

20. A non-transitory computer readable storage medium tangibly storing a program for testing services deployed to hardware components in an emergent system, the program comprising instructions that, when executed by a test computer including at least one processor, cause the computer to perform the method of claim 17.

21. A computer system for testing software and/or hardware components provided by in an emergent system, comprising:
processing resources including at least one processor and a memory; and
a registry stored on a non-transitory computer readable medium;
wherein the processing resources are configured to cooperate to at least:
detect when multiple calls affecting one or more of the components occur;
identify combinations of components based at least in part on said detection;
create a registry entry in the registry for each said identified combination, each said registry entry associating the respective identified combination with registered assets representing the components of the respective identified combination;
determine whether an identified combination is test-worthy; and
associate at least one executable test with each said identified combination that is determined to be test-worthy.

22. The system of claim 21, wherein the processing resources are further configured to cooperate to for each said identified combination that is associated with at least one executable test, execute the respective at least one executable test at a regular interval and/or when a component associated with the respective combination is modified.

23. The system of claim 21, wherein the processing resources are further configured to cooperate to automatically generate tests to be applied to each said identified combination that is determined to be test-worthy.

24. The system of claim 21, wherein identified combinations are classifiable into groups of similar combinations.

25. The system of claim 24, wherein the processing resources are further configured to cooperate to automatically subject identified combinations within a group to their associated tests when any one identified combination in that group is to be tested.

* * * * *

UNITED STATES PATENT AND TRADEMARK OFFICE
CERTIFICATE OF CORRECTION

PATENT NO. : 8,930,767 B2  
APPLICATION NO. : 13/708110  
DATED : January 6, 2015  
INVENTOR(S) : Harbarth et al.

Page 1 of 1

It is certified that error appears in the above-identified patent and that said Letters Patent is hereby corrected as shown below:

On the title page delete the following item

"(72)    Inventors:    Juliane Harbarth, Darmstadt (DE)  
Harald Sch-Ning, Dieburg (DE)  
Helmut Kuhn, Griesheim (DE)"

and Replace with:

(72)    Inventors:    Juliane Harbarth, Darmstadt (DE)  
Harald Schöning, Dieburg (DE)  
Helmut Kuhn, Griesheim (DE)

Signed and Sealed this  
Twenty-third Day of June, 2015

Michelle K. Lee  
*Director of the United States Patent and Trademark Office*